3,280,192
HYDROGENATION OF CINNAMIC ALDEHYDES AND DERIVATIVES THEREOF
Joseph Levy, Paramus, N.J., and Alvin Friedman, New York, N.Y., assignors to Universal Oil Products Company, Des Plaines, Ill., a corporation of Delaware
No Drawing. Filed May 4, 1965, Ser. No. 453,183
6 Claims. (Cl. 260—599)

This application is a continuation-in-part of our copending application Serial No. 210,830, filed July 18, 1962, now abandoned, which in turn is a continuation-in-part of our earlier application Serial No. 845,069, filed October 8, 1959, now abandoned.

This invention relates to a catalytic hydrogenation process for preferentially hydrogenating the olefinic double bond of unsaturated aldehydes and is directed particularly to the reduction of cinnamic aldehyde and its lower alkyl substituted derivatives to the corresponding dihydrocinnamic aldehydes.

The selective reduction of an olefinic linkage in the presence of a very readily reducible group such as an aldehyde function usually cannot be achieved directly. Thus, for example, the catalytic hydrogenation of cinnamic aldehyde and its lower alkyl substituted derivatives can result in a variety of products and mixtures of products of which the dihydrocinnamic aldehydes are highly useful because of their desirable odor. As is apparent from examining the molecule, the hydrogenation of cinnamic aldehyde can result in the production of cinnamic alcohol, dihydrocinnamic alcohol or dihydrocinnamic aldehyde as well as a mixture of these compounds. These various reactions are illustrated in the following equations insofar as the affected group is concerned.

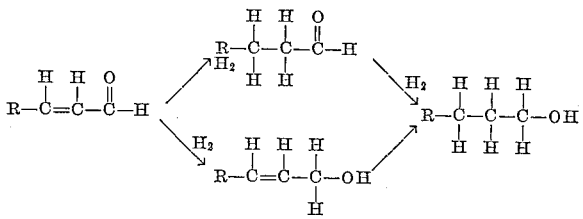

The production of dihydrocinnamic aldehydes has heretofore been accomplished most commonly by the use of platinum, palladium, or Raney nickel catalysts in an organic solvent, such as alcohol. However, it has been found difficult to control the reaction in such a manner as to selectively hydrogenate only the double bond. The reduction of the aldehyde function in the molecule to an alcohol occurs simultaneously, although at a slower rate, which results in a mixture of both compounds. Accordingly, in order to completely reduce the olefinic double bond, an excess of hydrogen above theory is required and when the hydrogenation is continued until the absorption of hydrogen ceases the products obtained consist of the desired dihydrocinnamic aldehyde admixed with the corresponding alcohol which can comprise as much as 30% of the mixture. The compounds thus produced can be separated by forming the bisulfite addition product of the aldehyde or the borate ester of the alcohol but these operations result in a further loss of the desired product and require a number of manipulating steps thereby increasing the cost of producing the material.

In order to reduce the amount of the by-product alcohol formed, the amount of hydrogen absorbed can be carefully controlled and the reaction interrupted when, for example, the stoichiometric amount of hydrogen necessary to reduce the double bond has been added. An example of this type of process is reported in United States Patent No. 2,875,131 of M. S. Carpenter et al. In this method, however, the desired dihydrocinnamic aldehyde is contaminated with both the cinnamic aldehyde starting material and an equivalent amount of dihydrocinnamic alcohol. The saturated and unsaturated aldehydes are extremely difficult to separate which usually necessitates the use of the contaminated mixture. The desirability of having a process which results in a high yield of the desired dihydrocinnamic aldehyde without the presence of these contaminates, therefore, is readily apparent.

Accordingly, it is an object of the present invention to provide a novel method for the selective reduction of olefinic double bonds of unsaturated aldehydes. Another object of the invention is to provide a process for producing such saturated aldehydes in high yields. Another object is to provide such a proces which substantially eliminates the production of undesired by-products. A further object of the invention is to provide such a process which has an automatic end point. Other objects and advantages of the process will appear from the following detailed description.

In accordance with the invention, it has been discovered that a highly selective hydrogenation of the double bond of cinnamic aldehyde and its lower alkyl substituted derivatives is effected by employing the combination of palladium as a catalyst and an aqueous alkaline reaction medium. When such a combination is used, the hydrogenation proceeds with substantially no formation of the undesirable alcohol by-product. What is even more significant, however, is that the process has an automatic end point in that the absorption of hydrogen ceases when only the olefinic double bond is saturated. The process, therefore, eliminates the necessity for critical control and results in the formation of reaction products of such purity that only simple distillation is necessary for separation and the usual purification steps heretofore required can be eliminated. This discovery is surprising since the aqueous alkaline reaction medium is a non-solvent for the aldehyde and creates two-liquid phases in the reaction mixture, i.e., the oil phase consisting of the cinnamic aldehyde, and an inert solvent if desired, and the alkaline aqueous phase.

The results obtained with the process of the invention are in sharp contrast to the results obtained under similar reaction conditions with palladium in the absence of the aqueous alkaline phase or when other catalysts are employed even in the presence of an aqueous alkaline phase. Table I shows a comparison of the results obtained with various catalysts and reaction mediums in the reduction of p-tertiary-butyl-alpha-methyl-cinnamic aldehyde when hydrogenation was allowed to proceed until absorption of hydrogen ceased.

TABLE I

| Starting Material | Catalyst | Reaction Medium | Yield Dihydrocinnamic Aldehyde | Presence [1] of Alcohol |
|---|---|---|---|---|
| p-t-Butyl-alpha-methylcinnamic aldehyde. | Palladium on charcoal | 5% aqueous sodium carbonate | 98 | Negligible. |
| Do | do | None | 60 | Large amounts dihydrocinnamic alcohol. |
| Do | Raney nickel | 5% aqueous sodium carbonate | 56.5 | Do. |
| Do | Platinum on charcoal | do | 24 | Large amounts cinnamic alcohol. |
| Do | Platinum oxide | 0.2% NaOH in ethanol | Negligible | Mostly cinnamic alcohol. |
| Do | Palladium on charcoal | do | 47.5 | Large amounts dihydrocinnamic alcohol. |

[1] Examination by infrared and ultraviolet spectra and refractive index.

The ability of an alkaline, aqueous medium to have such a desirable result on a catalytic hydrogenation process is quite unexpected and not readily understood. Although it is known that in certain instances, solvents play specific roles in catalytic reductions, it is generally considered that they are beneficial because they facilitate dispersion of the catalyst and contact of the catalyst, hydrogen and organic material. The use of a medium such as water, in which the organic material is substantially immiscible, has occasionally been employed particularly when the reduction product has appreciable water solubility. Normally, however, such an aqueous medium would be expected to impede the hydrogenation by preventing intimate contact of the materials and, indeed, this is often observed. There does not appear to be any reason to expect that an aqueous alkaline medium in a two-phase system would be so effective in producing a highly selective reduction of only the double bond, whereas, a one-phase system employing an alkaline agent in alcohol solution yields mixtures of the possible reduction products or, in some cases, the olefinic alcohol.

Cinnamic aldehyde and derivatives thereof substituted in either the ring or side chain with lower alkyl groups can be selectively reduced according to this invention. The aromatic ring may also be substituted with other groups which are inert to reduction under the conditions employed such as alkyl, alkoxy, methylenedioxy, ethylenedioxy, etc. Typical of the compounds which can be selectively hydrogenated are cinamic aldehyde, alphamethylcinnamic aldehyde, p-methylcinnamic aldehyde, m-methylcinnamic aldehyde, p-methyl-alpha-methylcinnamic aldehyde, p-ethyl-alpha-methylcinnamic aldehyde, p-isopropyl-alpha-methylcinnamic aldehyde, p - tertiary-butyl-alpha-methylcinnamic aldehyde, alpha-ethylcinnamic aldehyde, p-isopropyl-alpha-ethylcinamic aldehyde, p - methoxycinnamic aldehyde, p-methoxy-alpha-methylcinnamic aldehyde, 3,4-methylenedioxy-alpha-methylcinnamic aldehyde, o-methoxycinnamic aldehyde, m-methoxycinnamic aldehyde, etc.

The amount of the aqueous alkaline solution employed is not critical and equally good results are obtained either by using about the same weight of the alkaline solution as the cinnamic aldehyde or by using an amount just sufficient to wet the catalyst. The concentration of the alkaline reacting material in the aqueous solution has been varied from about 1% to as high as 20% with equivalent results.

The alkaline reacting substances which are effective in producing the selective hydrogenation obtained in the process of this invention are the alkali metal hydroxides and their alkaline reacting salts. Thus, we may employ sodium, potassium, or lithium hydroxides and those salts thereof which produce an alkaline reaction in aqueous solution. Typical of such salts are sodium acetate, sodium bicarbonate, potassium carbonate, trisodium phosphate, sodium carbonate, and the like. In general, we prefer to use materials such as sodium carbonate, potassium carbonate, and trisodium phosphate which have a pH of about 8 to 11 in 5% aqueous solution. At lower pH values, we have found that the results vary somewhat depending upon the additive used. Thus, somewhat less selective reductions are obtained with sodium acetate which gives a pH of about 8 in 5% aqueous solution although the reductions still are more selective than in the absence of such an additive. However, with sodium bicarbonate, which also gives a pH of about 8 in a 5% solution, highly selective reductions are obtained. Furthermore, we have obtained highly selective reductions and high yields when employing a 0.2% aqueous sodium hydroxide solution at the relatively high pH of about 12 to 13. The pH range of the aqueous alkaline solution used in the process, therefore, may extend from about 8 to 13, or higher.

As ordinarily carried out, the unsaturated aldehyde, catalyst, and alkaline reacting material are agitated under a pressure of hydrogen until absorption of hydrogen ceases. The catalyst is then removed by filtration and the product isolated.

The conditions of temperature and pressure which may be used in effecting the hydrogenation according to this invention are not critical and may be widely varied. In general, the hydrogenation may be effected at temperatures ranging from about 20° to 150° C. and at pressures ranging from about 10 to 600 pounds per square inch. The results obtained, however, vary somewhat depending upon the particular temperature and pressure utilized and the particular unsaturated aldehyde being hydrogenated. Accordingly, we have found that optimum results are generally obtained for the various aldehydes which may be hydrogenated according to this invention by preferably conducting the hydrogenation at a temperature ranging from about 25° to 100° C. and at pressures ranging from about 10 to 150 pounds per square inch.

The unsaturated aldehyde may be dissolved in an inert, substantially water immiscible, solvent, such as benzene or toluene or other hydrocarbon solvents, during the reaction if desired.

As a catalyst, we generally employ the commercially available 1 and 5% palladium on charcoal, but other carriers or types of palladium catalyst may be used. The amount of catalyst used is not critical and we prefer, for example, about 1% to 2% of a 5% Pd-charcoal catalyst based upon the weight of aldehyde.

The following examples are presented to illustrate the nature of our invention and to contrast it with methods wherein no aqueous alkaline medium is employed.

Example I

In order to demonstrate the results attained in the absence of the alkaline reacting agent, the following test is cited:

20.2 gms. (0.1 mol) p-tert-butyl-alpha-methyl-cinnamic aldehyde were hydrogenated in the presence of 0.4 g. of 5% palladium-charcoal catalyst at about 75–80° C. and under an initial pressure of about 60 p.s.i. of hydrogen. Absorption of hydrogen continued until about 0.13 mol had been taken up in about a period of 6 hours and then ceased. On working the reaction mixture up, there was obtained 19.3 g. (96% yield) of product analyzing about 60% aldehyde. Infrared and ultraviolet spectra of this product showed the absence of conjugated material, but indicated the presence of considerable hydroxylated material (i.e., the dihydrocinnamyl alcohol). This result is typical of those obtained in the absence of an alkaline reacting material.

*Example II*

Further, it is found that Raney nickel is not equivalent to palladium in the practice of the present invention as demonstrated by the following test:

A reduction of 21.2 gms. (0.1 mol) p-tert-butyl-alpha-methylcinnamic aldehyde was carried out at about 80° C. with 1.0 gm. Raney nickel catalyst and 20.2 gms. 5% aqueous sodium carbonate. Absorption of hydrogen proceeded unntil about 0.145 mol were absorbed and then ceased. There were obained 19.5 gms. (92% yield) of product analyzing 56.5% as the dihydrocinnamic aldehyde. Infrared spectrum showed large amount of hydroxylated material.

By way of contrast with the results attained in Examples I and II above, the following examples embodying the present invention are cited.

*Example III*

40.4 gms. p-tert-butyl-alpha-methylcinnamic aldehyde (0.2 mol) and 40.4 gms. of 5% aqueous sodium carbonate solution were agitated in the presence of 0.4 gms. of 5% palladium-charcoal catalyst at about 75° to 80° C. under an initial pressure of about 60 p.s.i. of hydrogen. There was absorbed about 0.2 mol of hydrogen as indicated by a pressure drop of about 17 p.s.i. during a period of about 6 hours, after which absorption of hydrogen ceased. The reaction mixture was then filtered to remove the catalyst and the product extracted with 100 g. benzene. After evaporating the solvent, the product was distilled to give 40.2 gms. (99.5% yield) of product analyzing 98% as p-tert-butyl-alpha-methyldihydrocinnamic aldehyde. Examination of the infrared spectrum and ultraviolet spectrum of this substance showed no conjugated olefinic material and negligible hydroxylated material.

*Example IV*

A reduction of 20.2 gms. p-tert-butyl-alpha-methylcinnamic aldehyde was carried out according to the general procedure of Example III except that 5% aqueous sodium bicarbonate was used instead of sodium carbonate. There was obtained 19.6 g. (98% yield) of the product analyzing 97% as the dihydrocinnamic aldehyde. Infrared spectrum showed only a small amount of hydroxylated material.

*Example V*

A reduction of 20.2 g. p-tert-butyl-alpha-methyl-cinnamic aldehyde was carried out according to the general procedure of Example III except that 5% aqueous trisodium phosphate was used instead of sodium carbonate. There were isolated 19.4 (97% yield) of the product analyzing 95% as the dihydrocinnamic aldehyde. Infrared spectrum showed negligible hydroxylated material.

*Example VI*

A reduction of 20.2 g. p-tert-butyl-alpha-methylcinnamic aldehyde was caarried out according to the general procedure of Example III except that 20.2 g. of a 0.2% aqueous sodium hydroxide was used instead of sodium carbonate. There were obtained 18.5 g. (93.5% yield) of the product analyzing 95.3% as the dihydrocinnamic aldehyde. Infrared spectrum of the product showed negligible hydroxylated material.

*Example VII*

A reduction of 40.4 g. p-tert-butyl-alpha-methylcinnamic aldehyde was carried out according to the general procedure of Example III except that 1 g. of 5% aqueous sodium carbonate and 0.8 g. of 5% palladium-charcoal were employed. There were obtained 40 g. (99% yield) of the product analyzing 96.5% as the dihydrocinnamic aldehyde. Infrared spectrum showed negligible hydroxylated material.

*Example VIII*

A reduction of 20.2 gms. p-tert-butyl-alpha-methylcinnamic aldehyde was carried out according to the general procedure of Example III except that 0.8 gm. of 1% palladium-charcoal was used instead of 5% palladium charcoal. There were obtained 20.2 gms. (100% yield) of the product analyzing 95% as the dihydrocinnamic aldehyde. infrared spectrum showed negligible hydroxylated material.

*Example IX*

A reduction of 20.2 gms. p-tert-butyl-alpha-methylcinnamic aldehyde was carried out according to the general procedure of Example III except that a 1% aqueous sodium carbonate solution was used instead of 5% solution. There were obtained 19.5 gms. (97% yield) of the product analyzing 94.6% as the dihydrocinnamic aldehyde. Infrared spectrum showed negligible hydroxylated material.

*Example X*

A reduction of 18.8 gms. p-isopropyl-alpha-methylcinnamic aldehyde was carried out according to the general procedure of Example III with 20.2 gms. 5% aqueous sodium carbonate and 0.4 gms. 5% palladium charcoal. There were obtained 17.8 gms. (95% yield) of product analyzing 91.5% as the p-isopropyl-alpha-methyldihydrocinnamic aldehyde. Infrared spectrum showed only small amount of hydroxylated material.

*Example XI*

A reduction of 14.6 gms. alpha-methylcinnamic aldehyde was carried out according to the general procedure of Example III with 0.3 gm. 5% palladium charcoal at about 50° C. There were obtained 14.5 gms. (99.5% yield) of product analyzing 95.5% as the alpha-methyldihydrocinnamic aldehyde. Infrared spectrum showed negligible hydroxylated material.

*Example XII*

A reduction of 26.4 gms. cinnamic aldehyde was carried out according to the general procedure of Example III with 26.4 gms. 5% aqueous sodium carbonate and 0.5 gm. 5% palladium-charcoal. There were obtained 23.2 gms. (89.5% yield) of product analyzing 92.5% as the dihydrocinnamic aldehyde. Infrared spectrum showed a small amount of hydroxylated material.

*Example XIII*

A reduction of 20.2 gms. p-tert-butyl-alpha-methylcinnamic aldehyde was carried out at about 50° C. according to the general procedure of Example III with 20.2 g. of 0.2% sodium hydroxide in 50% (by volume) of water-ethanol instead of 5% aqueous sodium carbonate. At this point in the processs, a two-phase system resulted. There were obtained after reduction, 19.4 gms. (97% yield) of the product analyzing 893% as the dihydrocinnamic aldehyde. Infrared spectrum showed a small amount of hydroxylated material. Thus, the presence of alcohol reduced the selectivity somewhat.

*Example XIV*

The procedure of Example III was repeated using the same quantities of materials except that the temperature was maintained at about 100° C. throughout the hydrogenation with the hydrogen pressure ranging between about 12 to 27 p.s.i. Absorption of hydrogen ceased after about 1.25 hours. The hydrogenation mixture was, however, agitated for an additional 0.5 hour while maintaining the above temperature and pressure to indicate that the hydrogen absorption had completely ceased. The catalyst was removed from the reaction mixture and the product extracted with benzene. Upon removing the benzene solvent, there was obtained about a quantitative recovery of product which analyzed from 92 to 94% of the dihydrocinnamic aldehyde by gas chromatography and oximation respectively. This product contained 3.75% dihydrocinnamic alcohol and was substantially free of unsaturated aldehyde. This material was distilled on a Vigreux column having negligible fractionating capacity to give a 92% weight yield of product analyzing 98% (minimum) as the desired saturated aldehyde. This material was highly suitable, as evidenced by the odor, for direct use in perfumery without further purification.

*Example XV*

The procedure of Example III was repeated using 290 gms. of p-tert.-butyl-alpha-methylcinnamic aldehyde and 290 gms. of 5% aqueous carbonate solution and 5.8 gms. of a 5% palladium-charcoal catalyst. The hydrogenation was effected at a temperature of about 74° to 80° C. and pressure ranging from about 70 to 30 p.s.i. and was continued until absorption of hydrogen ceased. The product mixture was filtered to remove the catalyst and thereafter the product extracted with benzene. After removing the benzene and distilling the residual product there was obtained 286 grams (97% yield) of product analyzing 93.7% as p-tert.-butyl-alpha-methyl dihydrocinnamic aldehyde, which was substantially free of unsaturated aldehyde starting material.

*Example XVI*

An experiment was conducted according to the procedure of Example III using 202 gms. of p-tert.-butyl-alpha-methylcinnamic aldehyde, 202 gms. of 5% aqueous carbonate solution, and 4.0 gms. of a 5% palladium-charcoal catalyst. The hydrogenation was effected at a temperature ranging from about 60° to 80° C. and a pressure ranging from about 150 to 100 p.s.i. Absorption of hydrogen ceased in about 1.25 hours. The hydrogenation mixture was, however, agitated for an additional hour while maintaining the above temperature and pressure to indicate that the mixture would not absorb further hydrogen. The catalyst was removed from the reaction mixture and the product extracted with benzene. Removal of the benzene yielded 195 gms. (95% yield) of material which analyzed by gas chromatography 88% (minimum) as p-tertiary butyldihydrocinnamic aldehyde, 10.65% as the corresponding alcohol and was substantially free of the cinnamic aldehyde starting material.

We claim as our invention:

1. The method of hydrogenating an unsaturated aldehyde to effect preferential hydrogenation of the olefinic double bond thereof, said aldehyde being selected from the group consisting of cinnamic aldehyde, cinnamic aldehydes substituted in the side chain with a lower alkyl group, cinnamic aldehydes substituted in the ring with a member selected from the group consisting of lower alkyl, alkoxy, and alkylenedioxy, and cinnamic aldehydes substituted in the side chain with a lower alkyl group and in the ring with a member selected from the group consisting of lower alkyl, alkoxy and alkylenedioxy which comprises hydrogenating under a pressure of from about 10 to 150 pounds per square inch and at a temperature of about 25° C. to 100° C. in the presence of palladium catalyst and in a two-phase liquid system comprising the unsaturated aldehyde and an aqueous alkaline solution of an alkaline agent selected from the group consisting of sodium, potassium and lithium hydroxides and the alkaline reacting salts thereof and continuing the hydrogenation until the absorption of hydrogen ceases.

2. The method of claim 1 wherein the unsaturated aldehyde is cinnamic aldehyde.

3. The method of claim 1 wherein the unsaturated aldehyde is alpha-methyl p-tertiary butylcinnamic aldehyde.

4. The method of claim 1 wherein the unsaturated aldehyde is alpha methyl p-isopropylcinnamic aldehyde.

5. The method of claim 1 wherein the alkaline agent is sodium carbonate.

6. The method of hydrogenating alpha methyl, p-tertiary butylcinnamic aldehyde to effect preferential hydrogenation of the double bond thereof which comprises hydrogenating under a pressure of no more than about 60 pounds per square inch and at a temperature of about 50° to 80° C. in the presence of palladium catalyst and in a two-phase liquid system comprising the aldehyde and an aqueous alkaline solution of an alkaline agent selected from the group consisting of sodium, potassium and lithium hydroxides and the alkaline reacting salts thereof, said aqueous alkaline solution being present in an amount at least substantially equal in weight to the amount of catalyst present and continuing the hydrogenation until the absorption of hydrogen ceases.

References Cited by the Examiner

UNITED STATES PATENTS 2,875,131   2/1959   Carpenter et al.   260—599

FOREIGN PATENTS 816,151   7/1959   Great Britain.

OTHER REFERENCES

West et al.: Synthetic Perfumes, 1949, p. 111.

LEON ZITVER, *Primary Examiner.*

DANIEL D. HORWITZ, *Examiner.*

R. H. LILES, *Assistant Examiner.*